United States Patent Office 3,766,114
Patented Oct. 16, 1973

3,766,114
BLENDS OF BLOCK POLYMERS AND
MICROCRYSTALLINE WAXES
John H. Walker and Fay W. Bailey, Bartlesville, Okla.,
assignors to Phillips Petroleum Company
No Drawing. Continuation-in-part of abandoned application Ser. No. 814,795, Apr. 9, 1969. This application Apr. 8, 1971, Ser. No. 132,535
Int. Cl. C08f *19/08, 45/52*
U.S. Cl. 260—28.5 B                    10 Claims

ABSTRACT OF THE DISCLOSURE

Blocking characteristics of radial or linear block polymers are essentially eliminated in a composition formed by blending particular microcrystalline paraffin waxes with radial or linear block polymers.

---

This is a continuation-in-part of application Ser. No. 814,795, filed Apr. 9, 1969, now abandoned.

This invention relates to a novel composition comprising microcrystalline paraffin waxes and radial or linear block polymers. This invention relates to a blend of particular microcrystalline paraffin waxes and radial or linear block polymers. This invention relates to a process for essentially eliminating blocking in radial or linear block polymers. This invention relates to a process for blending particular microcrystalline paraffin waxes with radial or linear block polymers to prevent blocking of sheets, slabs, pellet, or rolls, and the like, of said polymers.

It is known that some polymers after being formed into film, sheets, slabs, rolls, pellets, and the like, exhibit an undesired adhesion between touching layers of materials such as occurs during storage, shipment, use, etc.

This tendency for layers of materials to resist separation as by a separating force applied perpendicular to a film, etc., such as by simple lifting, has been defined as blocking.

The tendency of the contacting surfaces to block can result in breaks, tears, and marred surfaces as the materials are separated, such as can be noted when stacked sheets are pulled apart.

The extent of blocking will depend upon the particular physical properties of the polymer itself. Such variables as temperature, pressure, and humidity can also alter the degree to which the polymer exhibits the tendency to block. An increase in these variables will generally increase the degree to which the polymer exhibits the tendency to block.

Blocking of polymer material, especially under storage, at ambient temperatures or above ambient temperatures is a serious problem to the industry. Various anti-blocking agents, i.e., substances that reduce blocking when incorporated into the polymer or applied to their surface, have been previously employed.

Compounds such as sodium stearate, polyethylene, sodium dioctylsulfosuccinate, alkyl amines, hydrocarbon esters of phosphoric acid, and alkyl quaternary ammonium compounds have been employed in particular polymers and are usually incorporated into the polymer before extruding, molding, or casting, etc. It is known that specific anti-blocking agents can usually be employed only with particular polymers or types of polymers as these substances may not be compatible with the polymer or may adversely affect other described properties thereof.

Other compounds such as talc, silica, clay, starches, silicones and long-chain alkyl quaternary ammonium compounds have been employed by applying them to the surface of polymer either during or after extrusion, molding, or casting, to reduce blocking.

In accordance with this invention it has been discovered that the radial or linear block polymers employed according to this invention exhibit undesirable tendencies to block and that the hereinbefore described compounds are unacceptable anti-blocking agents for said radial or linear block polymers. Surprisingly, it has been found that if a composition comprising a radial or linear block polymer and a microcrystalline paraffin wax, in an amount in the range of about 0.1 to 20 parts by weight per 100 parts of polymer by weight (php.) and having a melting point in the range of about 120° to 200° F. and a hardness between 3 and 30, preferably 7 to 25, as determined by the needle penetration test ASTM D–1321–65, is produced, said composition is essentially free of blocking characteristics while other desirable properties, such as high green tensile strength, are retained. With rubbery block copolymers best results are obtained using 0.5 to 20 parts by weight of said microcrystalline wax per 100 parts of polymer by weight. With resinous block copolymers best results are obtained using 0.1 to 0.5, preferably 0.25 to 0.5, weight percent of said microcrystalline wax per 100 parts of polymer by weight. Good results can be obtained with either resinous or rubbery polymer using 0.5 to 20 parts by weight per 100 parts of polymer by weight.

It is an object of this invention to provide a novel composition comprising a microcrystalline paraffin wax and a radial or linear block polymer. It is an object of this invention to provide a radial or linear block polymer and microcrystalline wax composition that is essentially free from blocking characteristics. It is an object of this invention to provide a process for essentially eliminating blocking in radial or linear block polymers. It is an object of this invention to provide a process for blending particular microcrystalline paraffin waxes with radial or linear block polymers to prevent blocking of sheets, slabs, pellets or rolls, and the like, of said polymers, without adversely affecting the desirable properties, such as high green tensile strength, of said polymers.

It is a further object of this invention to provide shaped thermoplastic radial or linear block polymer that is essentially free of block characteristics.

Further objects and advantages of this invention will become apparent to those skilled in the art from the following description and discussion herein set forth.

According to this invention microcrystalline paraffin waxes in concentrations to provide in the range of about 0.1 to 20 parts by weight per 100 parts of polymer by weight (php.), said waxes having a melting point between 120° and 200° F., preferably above 150° F. and more preferably between 180° and 200° F., and a hardness between 10 and 30, preferably 11 to 15, as determined by the needle penetration test ASTM D–1321–65, are added to the radial or linear block polymers of this invention to prevent blocking of said polymers.

The microcrystalline paraffin wax component can be obtained by conventional methods as from waxy petroleum distillation residues, or by blending separately prepared microcrystalline waxes such that the aforedescribed characteristics of the wax are finally obtained. Microcrystalline paraffin waxes suitable for employment according to this invention are commercially available both in the United States and abroad.

The linear block polymers employed according to this invention can be broadly depicted as an A-B-A type polymer. The polymers are characterized by containing three joined segments, or blocks, wherein A represents a polymer segment having nonelastomeric properties and B represents an elastomeric polymer segment.

The segments or blocks of the linear block polymer are joined in an end-to-end arrangement through a primary chemical bond. Each polymeric segment can contain a sequence of monomeric units substantially of a single monomer and thus essentially comprise a homopolymer block or they can contain alternate segments of monomers and thus form a random copolymer block.

The nonelastomeric terminal segments of the linear block polymer comprise homopolymers made from monovinyl-substituted aromatic hydrocarbons containing from about 8 to 18 carbon atoms per molecule as well as copolymers, both random and block, comprising at least 70 percent by weight of one or more polymerized monovinyl-substituted aromatic hydrocarbons and not more than 30 percent by weight of one or more polymerized conjugated diene monomers containing from about 4 to 12 carbon atoms per molecule or polymerized polar monomers such as alpha-unsaturated nitriles, beta-unsaturated nitriles, and esters of acrylic and methacrylic acid.

The elastomeric segment of the linear block polymer can comprise homopolymers made from conjugated dienes containing from about 4 to 12 carbon atoms per molecule as well as copolymers, including both random and block, comprising at least 70 percent by weight of one or more polymerized conjugated dienes and not more than 30 percent by weight of one or more said polymerized polar monomers or said monovinyl-substituted aromatic hydrocarbon monomers.

The amount of polymer representing each polymer segment in relation to the whole linear block polymer can vary but must be of sufficient amount to impart elastomeric or nonelastomeric properties to that particular polymer segment. Generally each polymer segment of the linear block polymer comprises at least about 10 weight percent of the total weight of the linear block polymer.

The nonelastomeric segments comprise about 20 to 80, preferably 30 to 40, weight percent of the total weight of the linear block polymer. The elastomeric segment comprises about 80 to 20, preferably 70 to 60, weight percent of the total weight of the linear block polymer.

The linear block polymer which has been broadly characterized as an A-B-A type polymer can also be characterized as an A-B-Y-B-A type polymer when the method of preparation of the linear block polymer includes the addition of a polyfunctional treating agent. As in the A-B-A type polymer the A in the A-B-Y-B-A type polymer represents nonelastomeric polymer blocks and the two B's collectively represent the middle elastomeric polymer block with Y being representative of an atom or group of atoms derived from a polyfunctional treating agent which contained only two functional groups per molecule and which effected coupling of two A-B type block polymers to produce the linear block polymer containing the terminal nonelastomeric blocks and the middle elastomeric block.

The radial block polymers employed according to this invention can be in a broad sense depicted as an $(A-B)_xY$ type polymer or as $(A-B-A)_xY$ wherein A represents a nonelastomeric polymer block or segment and B represents an elastomeric polymer segment. Y is an atom or group of atoms derived from a polyfunctional treating agent used in the formation of the radial polymers and $x$ represents the number of functional groups of said polyfunctional treating agent and is an integer of at least 3.

The radial block polymer can thus be characterized as having at least three polymer branches with each branch of the radial block polymer comprising terminal nonelastomeric segments. The branches of the radial block polymer contain a terminal nonelastomeric segment and at least a second elastomeric polymer segment joined thereto. The branches can also contain a third segment of nonelastomeric polymer.

The polymer branch lastly described would then be identical to the aforedescribed linear block polymers of this invention. Coupling the linear block polymer with a polyfunctional treating agent having at least three functional groups thus forms one type of radial polymer. The most common types, however, of radial block polymers employed according to this invention contain only a terminal nonelastomeric segment and an elastomeric segment.

The nonelastomeric segment of the radial block polymer comprise homopolymers made from monovinyl-substituted aromatic hydrocarbons containing from about 8 to 18 carbon atoms per molecule as well as copolymers, including both random and block, comprising at least 70 percent by weight of one or more polymerized monovinyl-substituted aromatic hydrocarbon monomers and not more than 30 percent by weight of one or more of said conjugated diene monomers or polar monomers such as alpha-unsaturated nitriles, beta-unsaturated nitriles, and esters of acrylic and methacrylic acid.

The elastomeric segment of the radial polymer branch comprises homopolymers prepared from conjugated dienes containing from about 4 to 12 carbon atoms per molecule as well as copolymers, including both random and block, thereof, comprising at least 70 percent by weight of one or more polymerized conjugated diene monomers and not more than 30 percent by weight of one or more of said polymerized polar monomers or said monovinyl-substituted aromatic hydrocarbon monomers.

The amount of polymer representing each polymer segment in relation to the whole radial block polymer can vary but must be of sufficient amount to impart elastomeric or nonelastomeric properties to that particular polymer segment. Generally, each polymer segment of the radial block polymer comprises at least 5 weight percent of the total weight of the block polymer.

The nonelastomeric segments comprise about 20 to 80, preferably 30 to 40 weight percent of the total weight of the radial block polymer with the elastomeric segments comprising about 80 to 20, preferably about 70 to 60 weight percent of the total weight of the radial block polymer.

The radial and linear block polymers employed according to this invention can be prepared by conventional methods. Exemplary methods are disclosed in U.S. Pat. 3,281,383 issued to Zelinski et al. Oct. 25, 1966; U.S. Pat. 3,287,333 issued to Zelinski Nov. 22, 1966; and U.S. 3,251,905 issued to Zelinski May 17, 1966. These patents are hereby incorporated into this specification by reference thereto.

Preferably the final shaped polymer of this invention is thermoplastic and thus free of crosslinking agents. By shaped is meant an item in the final or intermediate stage of fabrication such as sheet, film, or the like.

The incremental addition of monomer method is the preferred method of preparing the radial and linear block polymers employed in this invention. The incremental addition of monomer method is characterized by first forming a nonelastomeric block or segment of polymer by polymerizing a monomer or mixture of monomers until substantially no initial monomer or monomers remain in the reaction mixture, adding a dissimilar monomer or mixtures of dissimilar monomers to the reaction medium in order to add to said nonelastomeric polymer block a block or segment of elastomeric polymer by continuing the polymerization.

Following the formation of the second elastomeric section, i.e., after substantially all of the monomer or mixtures of monomer have been polymerized, a terminal nonelastomeric polymer block can be formed by continuing the polymerization by charging additional monomer or monomers as before or a polyfunctional treating agent can be added to the polymerization mixture after the polymerization has been completed but prior to the inactivation of the polymerization initiator.

If a linear block polymer is prepared, the presence of the terminal nonelastomeric segments are essentially to impart the high raw tensile strength properties to the block polymer. In the formation of the radial block polymers these high raw tensile strength properties can be obtained by forming a polymer with the terminal segments of each polymer branch comprising a nonelastomeric segment.

The polyfunctional treating agents employed according to this invention in the preparation of the radial block polymers are the polyepoxides, polyamines, polyisocyanates, polyaldehydes, or polyhalides, described in U.S. Pat. 3,281,383 issued to Zelinski et al. Oct. 25, 1966, and the tin compounds disclosed in U.S. Pat. 3,393,182 issued to Trepka July 16, 1968. As stated before the number of functional groups per molecule of said polyfunctional treating agent in the preparation of the radial block polymers is at least three. One of said functional groups, i.e., one equivalent, per gram atom of lithium is the optimum.

The polyfunctional treating agents that can be employed according to this invention in the preparation of linear block polymers are those compounds that correspond to the treating agents disclosed for radial block polymer formation except that said compounds contain only two functional groups per molecule instead of the at least three functional groups per molecule.

Accordingly the diisocyanates, diimines (diaziridinyl), dialdehydes, dihalides, etc. can be employed as polyfunctional treating agents for linear block polymer formation.

Exemplary compounds are benzene-1,4-diisocyanate;
naphthalene-2,6-diisocyanate;
naphthalene-1,3-diisocyanate;
di(1-aziridinyl)ethyl phosphine oxide;
di(2-phenyl-1-aziridinyl)propyl phosphine oxide;
di(2,3-dimethyl-1-aziridinyl)hexyl phosphine sulfide;
1,4-naphthalene dicarboxyaldehyde;
1,5-pentanediol;
1,9-anthracene dicarboxyaldehyde;
2,4-hexanedione;
1,10-anthracenedione;
dichlorodiethylsilane;
dibromodibutylsilane;
difluorodicyclohexylsilane;
di-n-hexyldifluorotin;
diphenyldibromotin;
diethyldiallyltin;
dicyclohexyldichlorotin;
didodecylchlorobromotin;
di(3-methylphenyl)chloroallyltin;

and the like.

Other suitable difunctional treating agents include carbon dioxide and the divinylaromatic compounds disclosed in U.S. Pat. 3,280,084 issued to Zelinski et al. Oct. 18, 1966. Exemplary are 1,3 - divinylbenzene; 1,6 - divinylnaphthalene; 4,4'-divinylbiphenyl; and the like.

The process employed for producing the A-B-Y-B-A type linear block polymer is the same incremental monomer addition process as hereinbefore described except that the third monomer charge following the formation of the elastomer block is eliminated and a polyfunctional treating agent which contains only two functional groups per molecule is added to the polymerization mixture, containing the A-B type polymer, after the polymerization to form the elastomeric block has been completed, but prior to the inactivation of the polymerization initiator, so as to couple said A-B type polymers to form said linear block polymer. The polyfunctional treating agent can be employed in an amount sufficient to provide from about 0.05 to 2 preferably 0.5 to 5 to 1.5 equivalents per gram atom of lithium employed in said initiator. The polyfunctional treating agent is added to the polymerization mixture after the polymerization has been completed and prior to the inactivation of the initiator.

As hereinbefore mentioned some of the monomers that can be employed to form the linear and radial block polymers according to this invention include conjugated dienes containing from about 4 to 12 carbon atoms per molecule and monovinyl-substituted aromatic hydrocarbons containing from about 6 to 18 carbon atoms per molecule. Exemplary conjugated dienes are 1,3-butadiene, isoprene, 1,3 - pentadiene, 2,3 - dimethyl - 1,3-butadiene, 2 - ethyl - 1,3 - pentadiene, 1,3 - hexadiene, 2 - methyl - 1,3 - hexadiene, 1,3 - octadiene, 2 - methyl-1,3 - undecadiene, 2 - methyl - 3 - isopropyl - 1,3 - butadiene, and the like.

Exemplary monovinyl-substituted aromatic hydrocarbons are styrene; 3,5 - diethylstyrene; 4 - n - propylstyrene; 4 - cyclohexylstyrene; 4 - phenylstyrene; 4-methoxystyrene; 3 - pentoxystyrene; 2,4,6 - trimethylstyrene; 4-decylstyrene; 1 - vinylnaphthalene; 8 - phenyl-1-vinylnaphthalene 3-benzylstyrene and the like.

Exemplary of the aforementioned polar monomers which can be employed in the formation of the polymer segments formed from the polymerized mixtures of monomers are epsilon-caprolactone; epsilon-thiocaprolactone; propylene sulfide; acrylonitrile; methacrylonitrile; butylacrylate; methylmethacrylate; acetaldehyde and the like.

The organolithium initiators disclosed in the aforementioned patents can be suitably employed in the preparation of the polymers of this invention. Hydrocarbyllithium initiators, in particular alkyllithium initiators, are preferably employed. The amount of initiator can vary over a broad range but will usually be in the range of about 0.1 to 10, preferably about 1.0 to 4.0 gram millimoles per 100 grams of monomer employed in the polymerization process.

Polymerization conditions well known as suitable for the preparation of polymers using an organolithium catalyst can be so employed according to this invention. Temperatures can vary over a broad range. Temperatures from $-80°$ to $150°$ C., preferably from about 40 to $120°$ C. are exemplary. The polymerization reaction can be conducted under autogenous pressure. It is usually desirable to operate at pressures sufficient to maintain the monomeric materials substantially in the liquid phase.

Polymerization can be conducted in the presence or absence of diluent. Inert hydrocarbon diluents selected from aromatics, paraffins, or cycloparaffins, and mixtures thereof containing from about 4 to 10 carbon atoms can be suitably employed. The diluent or diluent mixture is one which is liquid under conditions of the polymerization process and exemplary diluents are isobutane, n-pentane, cyclohexane, benzene, toluene, xylene, naphthalene, and the like.

The microcrystalline paraffin waxes employed in this invention are incorporated into the radial or linear block polymer before the polymer is extruded, molded, cast, and the like, into films, sheets, slabs, pellets, and the like.

The microcrystalline paraffin wax can be blended into the polymer by conventional methods. The waxes and polymer are preferably blended in a rolling mill or Banbury mixer at a temperature above the melting point of the wax. The blending times need only be sufficient to incorporate the wax and can be generally accomplished in about 2 to 10 minutes. Other techniques, such as premelting of the wax and adding the melted wax incrementally to the mill can, of course, be employed.

The blends of block polymer and microcrystalline waxes are essentially free of blocking characteristics while other desirable properties such as high green tensile strength are retained. It is to be understood that the term "essentially free from blocking" or similar terminology, as used throughout the specification and claims is to be interpreted to mean that layers of polymeric material can be separated by a force applied perpendicular to the film, sheet, slab, or the like, without resulting in breaks, tears and marred surfaces to the polymeric material and that the films, sheets, or pellets, and the like, will slide over each other or can be separated easily.

The term blocking, as may be used throughout the specification and claims, means that said layers, pellets, and the like have to be pulled apart. The resulting polymer surfaces can contain breaks, tears, or mars, and the like. The layers thus cannot be separated by sliding one layer over the other.

The blended radial or linear block polymer wax compositions of this invention have application where unblended radial or block polymers could be suitably employed, such as in molded or extruded articles such as coated wire. They can also be used in the manufacture of gaskets and the like. They can also be blended with extender oils, and other additives, such as antioxidants, fillers, pigments, dyes, etc.

The advantages of this invention, however, are especially realized in the storage, use, transportation, and the like, of these polymers when they are formed into the aforementioned sheets, slabs, layers, pellets, and the like.

Further objects and advantages of this invention will become evident to those skilled in the art from the foregoing discussion and following examples and claims. The following examples are illustrative of this invention but it should be understood that various materials used and the amounts employed are illustrations of preferred embodiments of this invention and that these examples should not be construed to unduly limit the scope of this invention.

The radial block polymers employed in the following examples were prepared in cyclohexane solvent employing the following charge order: solvent, styrene, sec-butyllithium initiator. After completion of the styrene polymerization, butadiene was charged and polymerized onto the polystyrene molecules. After completion of the butadiene polymerization, the block polymer was coupled with the polyfunctional treating agent, Epoxal 9–5 (epoxidized linseed oil) to form a branched block polymer with terminal polystyrene segments or tails.

The linear block polymers employed in the following examples were prepared in the same manner as the radial block polymers except that the initial charge comprises only one-half of the total styrene monomer empolyed with the remaining one-half charged on completion of the butadiene polymerization. The polyfunctional treating agent is not employed. Upon completion of the final styrene polymerization to form a block polymer comprising a polystyrene-polybutadiene-polystyrene arrangement, a fatty acid, i.e., partially hydrogenated tallow acid P–59, Procter & Gamble, was added to deactivate the initiator or short-stop the reaction.

EXAMPLE I

A radial block polymer (70 weight percent polymerized butadiene monomer and 30 weight percent polymerized styrene monomer, Mooney viscosity MS–4–58, melt index 18, prepared with a sec-butyllithium initiator and a polyfunctional treating agent, Epoxal 9–5) batch was blended in a rolling mill for 2.5 minutes at 300° F. with 1 phr. of a microcrystalline paraffin wax having a melting point of 120° F. and a hardness of 15 (needle penetration test, ASTM D–1321–65).

The polymer/wax blend was molded into 2¾ x 3 x ⅟₁₆-inch slabs which were stacked under a compression load of 50 pounds for 16 hours. Ambient temperatures, i.e., a room temperature of 75° F., were employed throughout the test. Control slabs of polymer were likewise prepared except the wax material was not incorporated therein.

Following the above described test the control slabs were highly blocked while the slabs produced according to this invention were not. The above example demonstrates that the radial block polymer/wax compositions produced according to this invention do not block.

EXAMPLE II

Two linear block polymer batches, i.e., A (65 weight percent polymerized butadiene monomer and 35 weight percent polymerized styrene monomer, Mooney viscosity MS–4–49, melt index 10, prepared with sec-butyllithium initiator) and B (60 weight percent polymerized butadiene monomer and 40 weight percent polymerized styrene monomer, Mooney viscosity MS–4–18, melt index 10, prepared with sec-butyllithium initiator) were each blended in a rolling mill with varying amounts of the wax employed in Example I and then tested accordingly. In addition, sheets were prepared and cut to 12 x 12, 0.015-inch thick and tested according to the conditions of Example I. Various controls were likewise tested. The results of these tests are reported in Table I.

TABLE I

| Polymer | Blended Additive | Php. | Test material | Results |
|---|---|---|---|---|
| A | Microcrystalline paraffin wax (M.P. 120° F.). | 0.5 | Slab | No blocking. |
| B | do | 0.5 | Sheet | Do. |
| A | do | 1.0 | Slab | Do. |
| B | do | 1.0 | Sheet | Do. |
| A | do | 5.0 | Slab | Do. |
| B | do | 5.0 | Sheet | Do. |
| A | do | 10.0 | Slab | Do. |
| B | do | 10.0 | Sheet | Do. |
| B | do | 20.0 | do | Do. |
| A | Dimethyl siloxane | 0.5 | do | Blocked. |
| A | Cosden 500 polystyrene [1] | 5 | do | Do. |
| A | do | 10 | do | Do. |
| A | do | 20 | do | Do. |
| A | Control—No additive | | Slab | Do. |
| B | do | | Sheet | Do. |

[1] Styrene homopolymer, melt flow 2 at 200° C. under 5 kg. load (ASTM D–1238–62T).

The above example effectively demonstrates the superior linear block polymer/wax composition produced according to this invention.

EXAMPLE III

Radial and linear block polymers blended with microcrystalline waxes, or other control additives, were employed in varying amounts as in Examples I and II. The test material employed was in the form of slabs. Additionally the tests were performed at 120° F. to determine the blocking effect at increased temperatures. The results of these tests are reported in Table II.

TABLE II

| Block polymer | Blended additive | Php. | Results 75° F. | 120° F. |
|---|---|---|---|---|
| Radial [1] | Paraseal [2] | 1.0 | No blocking | |
| Do | do | 5.0 | do | |
| Do | Ceratak [3] | 0.5 | do | No blocking. |
| Do | do | 1.0 | do | Do. |
| Do | do | 2.0 | do | Do. |
| Do | do | 5.0 | do | Do. |
| Do | No additive | | Blocked | Blocked. |
| Linear [4] | San Roque Wax [5] | 0.5 | do | |
| Do | do | 1.0 | do | |
| Do | do | 2.0 | do | |
| Do | do | 5.0 | do | |
| Do | No additive | | Blocked | Blocked. |

[1] 65 wt. percent polymerized butadiene monomer and 35 wt. percent polymerized styrene monomer, sec-butyllithium initiator, prepared at 118–173° F., 3.6 hours, Mooney viscosity MS–4–59, polyfunctional treating agent—Epoxal 9–5 (epoxidized linseed oil).
[2] A microcrystalline paraffin wax, W. & F. Mfg. Co., Buffalo, N.Y. Melting point 120–124° F., hardness 20–24.
[3] A microcrystalline paraffin wax, Bareco Div. Petrolite Corp., melting point 162° F., hardness 22–25.
[4] Same as polymer B of Example II.
[5] A microcrystalline paraffin wax, Phillips Petroleum (Venezuela), melting point 135° F., hardness 15–20.

The above example further demonstrates surperiority of the compositions of this invention in that they can retain their anti-blocking tendencies even at elevated temperatures and pressures.

EXAMPLE IV

Pelletized radial or linear block polymer/wax compositions were packaged in polyethylene bags and placed in a forced draft oven at 120° F. for 48 hours and blocking of the pellets then determined. The pellets were manufactured by incorporating the wax on a roll mill at 3 parts by weight per 100 parts by weight of polymer (php.) at 300° F. for 3 minutes and then pelletized on a 1½ inch extruder to form pellets ⅛ inch in diameter and ⅛ inch long. Blocking tests are reported in Table III.

TABLE III

| Block polymer | Wax | Results |
| --- | --- | --- |
| Radial¹ | None | Blocked. |
| Do | Aristowax² | No blocking. |
| Do | Advawax³ | Blocked. |
| Do | Be Square⁴ | No blocking. |
| Linear⁵ | None | Blocked. |
| Do | Aristowax² | No blocking. |
| Do | Advawax³ | Blocked. |
| Do | Be Square⁴ | No blocking. |
| Radial⁶ | None | Blocked. |
| Do | Advawax³ | Do. |
| Do | Aristowax² | No blocking. |
| Do | Be Square Wax⁴ | Do. |

¹ 65 wt. percent polymerized butadiene monomer, 35 wt. percent polymerized styrene monomer, sec-butyllithium initiators 0.20 php., Epoxal 9-5—polyfunctional treating agent at 0.5 wt. percent php., 30 php. of aromatic oil, MS-4 at 212° F.—39, melt index at 180° C.—9.5.
² Microcrystalline paraffin wax, Union Oil Co., melting point 165° F., hardness 15.
³ A synthetic was (control), N-N′-ethylene-bis-stearamide, Carlisle Chem. Works, Oreg., melting point 280° F.
⁴ Microcrystalline paraffin wax, Bareco Div. Petrolite Corp., melting point 180-185° F., hardness 11-12.
⁵ 65 wt. percent polymerized butadiene monomer, 35 wt. percent polymerized styrene monomer, sec-butyllithium initiator, 0.12 php., MS-4 at 212° F.—39, melt index at 180° C.—36; 37.5 php. of aromatic oil.
⁶ 60% polymerized butadiene monomer, 40% polymerized styrenemonomer, sec-butallithium initiator, 0.20 php., polyfunctional treating agent 0.5 epoxidized linseed oil, Epoxal 9-5, 30 php. of aromatic oil, MS-4 at 212° F.—41, melt index at 180° C.—32.

The above example demonstrates that oil masterbatches of radial or linear block polymers can be employed according to this invention. This example further demonstrates that other forms such as pellets may be manufactured with the concepts of this invention equally applicable to this common form of manufacture. Waxes outside of the scope of this invention, i.e., Advawax, was ineffective to prevent blocking in the block polymers of this invention.

EXAMPLE V

A radical resinous block copolymer (75 weight percent polymerized styrene and 25 weight percent polymerized butadiene) prepared with a butyllithium initiator and a polyfunctional treating agent, Epoxal 9-5, was blended with 0.25 weight percent of a microcrystalline paraffin wax having a melting point of 190-195° F. and a hardness of 7 (needle penetration test, ASTM D-1321). Slot film 3.5 to 4 mil was extruded using a 1-inch extruder. Similar films were made without anti-block agent and with the same concentration of other materials such as zinc stearate, stearic acid, calcium stearate, sodium stearate, and a paraffin wax outside the scope of the invention. Film rolls were aged 18 hours at 150° F. and evaluated for blocking. The blocking was rated as follsws: 0, no blocking; 1, tacky; 2, surface marred; and 3, tearing of film during unrolling. The results were as follows.

TABLE IV

| Additive: | Blocking rating |
| --- | --- |
| None | 3 |
| Stearic acid | 3 |
| Zinc stearate | 3 |
| Sodium stearate | 3 |
| Paraffin wax (melting point 110° F.) | 3 |
| Microcrystalline wax of invention | 0 |

The above example demonstrates the remarkable improvement in blocking characteristics flowing from use of the wax of the invention as compared with other materials, even to the extent of giving complete protection after storage at elevated temperature.

We claim:

1. A shaped thermoplastic article of a polymer essentially free from blocking characteristics comprising a radial or linear block polymer of 0.1 to 20 parts by weight per 100 parts of block polymer by weight of a microcrystalline paraffin wax having a melting point in the range of about 120° to 200° F. and a hardness between 10 and 30, as determined by needle penetration test ASTM D-1321-65, said block polymer comprising about 20 to 80 weight percent of non-elastomeric segments and about 80 to 20 weight percent of elastomeric segments wherein said non-elastomeric segments comprise polystyrene, and wherein said elastomeric segments comprise polybutadiene.

2. An article according to claim 1 wherein said radial block polymer can be represented as having any of the following general configurations (a) $(A-B)_xY$ or (b) $(A-B-A)_xY$ wherein A represents a nonelastomeric polymer segment and B represents an elastomeric polymer segment, wherein Y is an atom or group of atoms derived from a polyfunctional treating agent containing at least three functional groups and $x$ represents the number of functional groups of said polyfunctional treating agent and is an integer of at least 3; wherein said linear block polymer can be represented as having the general configuration A-B-A or A-B-Y′-B-A, wherein A represent a nonelastomeric polymer segment and B represents an elastomeric polymer segment, wherein Y′ is an atom or group of atoms derived from a polyfunctional treating agent containing only two functional groups per molecule; wherein said polyfunctional treating agent is selected from carbon dioxide, divinyl aromatic compounds, polyepoxides, polyamines, polyisocyanates, polyaldehydes, polyhalides or tin compounds; and wherein said block polymer comprises about 30 to 40 weight percent of non-elastomeric segments and about 70 to 60 weight percent of elastomeric segments.

3. An article according to claim 2 wherein each polymer segment of the linear block polymer comprises at least about 10 weight percent of the total weight of said linear block polymer and wherein each polymer segment of the radial block polymer comprises at least 5 weight percent of the total weight of said radial block polymer.

4. An article according to claim 2 wherein said block polymer is said radial block polymer represented by the general configuration $(A-B)_xY$.

5. An article according to claim 1 wherein said microcrystalline paraffin max has a melting point between 180° and 200° F. and a hardness between 11 and 15 as determined by the needle penetration test ASTM D-1321-65.

6. An article according to claim 1 in the form of a sheet.

7. An article according to claim 1 in the form of a film.

8. An article according to claim 1 wherein said block polymer is a resinous radial polymer and wherein said concentration of said wax is within the range of 0.1 to 0.5 weight percent.

9. An article according to claim 1 wherein said block polymer is a rubbery radial polymer and wherein said wax is present in a concentration within the range of 0.5 to 20 weight percent.

10. An article according to claim 8 wherein said microcrystalline wax has a melting point within the range of 180-200° F.

(References on following page)

References Cited

UNITED STATES PATENTS

| | | | |
|---|---|---|---|
| 3,441,530 | 4/1969 | Bauer et al. | 260—876 B |
| 3,352,944 | 11/1967 | Wheat | 260—28.5 B |
| 3,366,585 | 1/1968 | Davison et al. | 260—28.5 B |
| 3,428,712 | 2/1969 | Carrock et al. | 260—28.5 B |
| 3,380,938 | 4/1968 | Jack et al. | 260—28.5 B |
| 3,632,540 | 1/1972 | Unmuth et al. | 260—28.5 B |

OTHER REFERENCES

Chemistry & Technology of Waxes, 2nd ed., Warth, 1956, p. 429 relied upon.

MORRIS LIEBMAN, Primary Examiner

S. L. FOX, Assistant Examiner

U.S. Cl. X.R.

260—876 B